(12) United States Patent
Hsueh

(10) Patent No.: US 11,491,396 B2
(45) Date of Patent: Nov. 8, 2022

(54) INFORMATION PROCESSING METHOD AND ELECTRONIC DEVICE

(71) Applicant: Lenovo (Beijing) Co., Ltd., Beijing (CN)

(72) Inventor: Peng-Yueh Hsueh, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 48 days.

(21) Appl. No.: 16/584,365

(22) Filed: Sep. 26, 2019

(65) Prior Publication Data

US 2020/0101378 A1 Apr. 2, 2020

(30) Foreign Application Priority Data

Sep. 30, 2018 (CN) .......................... 201811158298.3
Sep. 30, 2018 (CN) .......................... 201811163067.1

(51) Int. Cl.
| | |
|---|---|
| A63F 13/42 | (2014.01) |
| A63F 13/2145 | (2014.01) |
| A63F 13/55 | (2014.01) |
| G06F 3/0481 | (2022.01) |
| G06F 3/0484 | (2022.01) |
| G06K 9/62 | (2022.01) |

(52) U.S. Cl.
CPC .......... *A63F 13/42* (2014.09); *A63F 13/2145* (2014.09); *A63F 13/55* (2014.09); *G06F 3/0481* (2013.01); *G06F 3/0484* (2013.01); *G06K 9/6217* (2013.01); *A63F 2300/6045* (2013.01)

(58) Field of Classification Search
CPC ...... A63F 13/2145; A63F 13/42; A63F 13/55; A63F 2300/6045; A63F 13/533; A63F 13/5375; A63F 13/63; A63F 13/87; G06F 3/0481; G06F 3/0482; G06F 3/0484; G06F 3/04842; G06F 3/04845; G06K 9/6217

See application file for complete search history.

(56) References Cited

U.S. PATENT DOCUMENTS

| | | | | |
|---|---|---|---|---|
| 6,865,290 | B2 * | 3/2005 | Kohchi | G06V 30/413 382/173 |
| 8,918,739 | B2 * | 12/2014 | Butin | G06F 9/451 715/705 |
| 9,665,960 | B1 * | 5/2017 | Masters | G06T 13/80 |
| 10,871,894 | B2 * | 12/2020 | Polyulya | G06F 3/04842 |
| 2001/0012400 | A1 * | 8/2001 | Wang | G06V 30/413 382/181 |

(Continued)

FOREIGN PATENT DOCUMENTS

| | | |
|---|---|---|
| CN | 1659877 A | 8/2005 |
| CN | 104461474 A | 3/2015 |

(Continued)

*Primary Examiner* — Seng H Lim
(74) *Attorney, Agent, or Firm* — Anova Law Group, PLLC

(57) ABSTRACT

An information processing method and an electronic device are provided. The method includes: acquiring an instruction for processing an image including a plurality of objects; in response to the instruction for processing the image, obtaining one or more objects, wherein a first object among the one or more objects has an object type consistent with a type of the image; and generating an interactive interface including the one or more objects and the interactive interface being configured for selecting a target object.

10 Claims, 16 Drawing Sheets

(56) References Cited

U.S. PATENT DOCUMENTS

| | | | | |
|---|---|---|---|---|
| 2005/0180645 A1* | 8/2005 | Hasegawa | H04N 1/41 | 382/239 |
| 2007/0044013 A1* | 2/2007 | Hyatt | H04M 1/7243 | 715/239 |
| 2009/0190830 A1* | 7/2009 | Hasegawa | G06K 9/00456 | 382/165 |
| 2009/0297024 A1* | 12/2009 | Dai | G06V 30/413 | 382/199 |
| 2012/0030568 A1* | 2/2012 | Migos | G06F 3/0486 | 715/702 |
| 2012/0289290 A1* | 11/2012 | Chae | G06F 3/0488 | 455/566 |
| 2012/0302167 A1* | 11/2012 | Yun | G06F 3/0416 | 455/41.2 |
| 2013/0028520 A1* | 1/2013 | Kondo | G06T 7/90 | 382/195 |
| 2013/0028524 A1* | 1/2013 | Kondo | G06V 30/18086 | 382/199 |
| 2013/0257892 A1* | 10/2013 | Ozawa | G06V 10/26 | 345/589 |
| 2015/0177953 A1* | 6/2015 | Khalsa | H04N 21/4725 | 715/716 |
| 2016/0093106 A1* | 3/2016 | Black | G06K 9/00624 | 345/633 |
| 2016/0139777 A1* | 5/2016 | Pinho | G06F 3/04845 | 715/771 |
| 2016/0299680 A1* | 10/2016 | Polyulya | G06F 3/0488 | |
| 2017/0272648 A1 | 9/2017 | Kraft et al. | | |
| 2018/0188939 A1* | 7/2018 | Alexander | G06F 3/04845 | |
| 2019/0114065 A1* | 4/2019 | Tsao | G06F 3/04847 | |
| 2021/0150263 A1* | 5/2021 | Corwin | G06F 8/20 | |

FOREIGN PATENT DOCUMENTS

| | | |
|---|---|---|
| CN | 104978146 A | 10/2015 |
| CN | 105117380 A | 12/2015 |
| CN | 105704396 A | 6/2016 |
| CN | 106020647 A | 10/2016 |
| CN | 107273013 A | 10/2017 |
| CN | 107391286 A | 11/2017 |
| CN | 107766163 A | 3/2018 |
| CN | 107908337 A | 4/2018 |
| CN | 107908489 A | 4/2018 |

* cited by examiner

INFORMATION PROCESSING METHOD AND ELECTRONIC DEVICE

CROSS-REFERENCES TO RELATED APPLICATIONS

This application claims the priority of Chinese Patent Application No. 201811158298.3, filed with the State Intellectual Property Office of P. R. China on Sep. 30, 2018 and Chinese Patent Application No. 201811163067.1, filed with the State Intellectual Property Office of P. R. China on Sep. 30, 2018, the entire content of which is incorporated herein by reference.

FIELD OF THE DISCLOSURE

The present disclosure generally relates to the field of information processing technology and, more particularly, relates to an information processing method and an electronic device.

BACKGROUND

When operating an electronic device (e.g., a computer, a mobile communication terminal, etc.), a user may use one or more images. Under certain circumstances, only a portion of an object in an image may be needed. As such, the user is required to input the image into a specialized image processing software, manually crop out the required portion of the object in the image through the image processing software, and then copy and paste the cropped-out object to a desired location. Further, processing different objects in the images may require different image processing software programs.

Generally, when pasting an object, only the object of a most recent copying or cutting operation can be pasted. When objects in multiple positions need to be pasted, repeated copy actions and paste actions are needed. Thus, user's operations are complicated and inefficient.

BRIEF SUMMARY OF THE DISCLOSURE

The present disclosure provides an information processing method and an electronic device to at least partially solve the technical problem in the existing technology.

One aspect of the present disclosure provides an information processing method. The method includes: acquiring an instruction for processing an image including objects; in response to the instruction for processing the image, obtaining one or more objects, wherein a first object of the one or more objects has a type consistent with a type of the image; and generating an interactive interface including the one or more objects and the interactive interface being configured for selecting a target object.

Another aspect of the present disclosure provides an electronic device. The electronic device includes: a display unit; a memory configured to store a plurality of instructions; and a processor configured to retrieve and execute the plurality of instructions stored in the memory to: acquire an instruction for processing an image including at least one object; in response to the instruction for processing the image, obtaining one or more objects. A first object of the one or more objects has a type consistent with a type of the image. The processor is further configured to generate an interactive interface including the one or more objects and configured for selecting a target object.

Another aspect of the present disclosure provides a data processing method. The method includes receiving an input operation from an input area; and displaying one or more to-be-pasted objects for selecting a target object. The one or more to-be-pasted objects include a copied or cut object obtained in response to a copy action or a cut action prior to the input operation.

Another aspect of the present disclosure provides an electronic device. The electronic device includes: a display screen; and a processor configured to receive an input operation from an input area and to display to-be-pasted objects for selecting a target object. The to-be-pasted objects include a copied object obtained in response to a copy action or a cut action prior to the input operation.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

In the specification, claims and drawings, terms "first", "second", "third", "fourth", etc. (if present) are used to distinguish similar parts and are not necessarily used to describe a specific sequence or order. It should be understood that the embodiments of the present disclosure described herein may be implemented in a sequence other than that illustrated herein.

DETAILED DESCRIPTION

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

The present disclosure provides an information processing method to be applied to an electronic device. The electronic device may be a computer, such as a desktop computer, a notebook computer, a tablet computer, etc., or a mobile communication terminal, such as a smart phone, etc.

Figure 1:
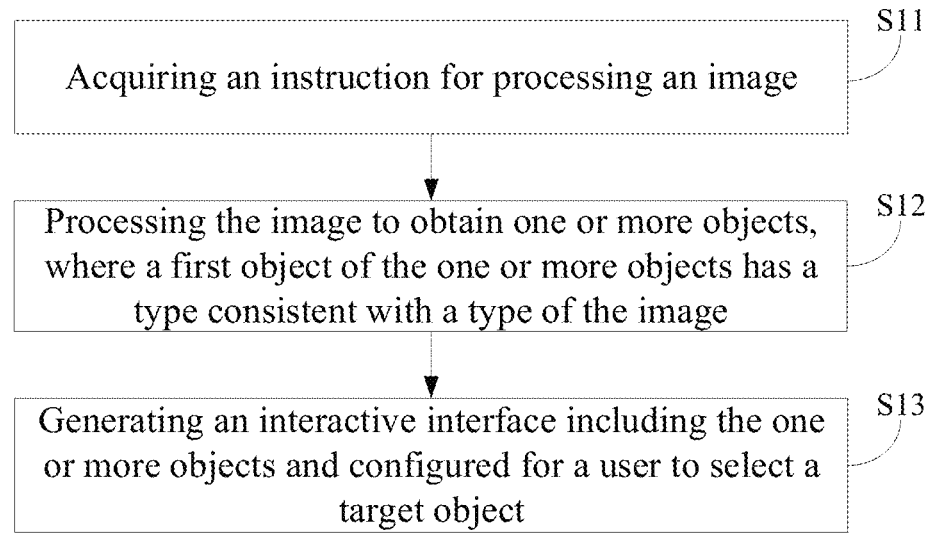
FIG. 1 illustrates a flowchart of an example of an information processing method according to some embodiments of the present disclosure.

FIG. 1 illustrates a flowchart of an example of an information processing method according to some embodiments of the present disclosure. As shown in FIG. 1, the method may include the following process.

Step S11: acquiring an instruction for processing an image, the image including one or more objects.

The one or more objects may be of a same type or at least two types. For example, the one or more objects may be entirely images or graphics. Alternatively, the one or more objects may include images, texts, and graphics.

Step S12, in response to the instruction for processing the image, obtaining one or more objects, where a first object of the one or more objects has a type consistent with the image.

In one embodiment, processing the image extracts the one or more objects from the image to obtain the one or more objects independent of the image. The one or more objects includes one or more objects having the type consistent with the type of the image. In other words, the first object may be a sub-image of the image.

Step S13: generating an interactive interface including the one or more objects, where the interactive interface is configured for the user to select one or more target objects.

The interactive interface may be directly generated after the one or more objects are obtained. After the user selects one or more target objects from the one or more objects, the user may choose to further process the selected one or more target objects, such as copying, cropping, etc. Then, the user may paste copied or cropped objects to a desired location, such as an editable file (e.g., a word file, a PPT file, etc.), or, an input area, such as an input area of a dialog interface of an instant messaging application (e.g., WeChat, 263, short message, etc.).

The interactive interface may be also generated after the user executes a pre-set operation.

The interactive interface may only include the one or more objects or may include other selectable objects, such as one or more objects obtained by processing other images. In other words, the interactive interface may include one or more objects obtained by processing at least two images. The one or more objects obtained by processing a current image may be placed ahead of the one or more objects obtained by processing the other images.

The present disclosure provides the information processing method. In response to the instruction for processing the image to generate objects, the image is processed to obtain the one or more objects of the image. That is, the one or more objects are extracted from the image. The user selects one or more target objects for further processing, thereby avoiding manually extracting objects from the image and simplifying the user's operations.

In one embodiment, the one or more objects includes two objects of different types. For example, the two objects of different types may include a text and a pure image (i.e., an image not including any text). The object of the pure image may be a picture or a graphic. In other words, the objects of different types are obtained by processing the image.

In one embodiment, the interactive interface may also include the image. That is, the user may select the original image as the target object or may select the object extracted from the original image as the target object.

In one embodiment, the process of obtaining the one or more objects by processing the image may include any of the following approaches.

In one embodiment, the image is subject to an outline detection to obtain at least one outline. Each outline corresponds to one first object. At least one first object is obtained from the at least one outline. After the outline is detected, the image is divided, such that each divided region only contains one outline. That is, each region only contains one object. Further, before the image is divided, to obtain the object more accurately, the object in the detected outline may be compared with known objects in a database to determine the object that most resembles the object in the outline. Then, the outline is corrected based on the most resembled object to perfect the object in the outline. For example, assuming that the object in a detected first outline most resembles a known human body. Through the comparison, the object in the first outline is found to be missing hair. A hair detection process may be performed along an edge of the first outline in the image. Then, the outline of the detected hair and the first outline are combined to obtain a complete outline of the human body.

In another embodiment, the image is divided into a foreground and a background to obtain a foreground image and a background image. That is, both the foreground image and the background image contain the first object.

In some embodiments, both methods may be implemented simultaneously. The user may select one of the two methods to process the image to obtain the one or more objects according to actual requirements.

In one embodiment, if the image also contains the text, in addition to processing the image to obtain the first object, the image may be further subject to a text recognition process to obtain at least one text portion. Different text portions may include different text objects. In other words, the one or more objects obtained by processing the image may also include a second object in addition to the first object. The second object is the text, having a type different from the type of the image.

For example, the image may be subject to an optical character recognition (OCR) process to obtain the text object.

All texts in the image may be recognized as a whole. That is, the recognized texts are treated as one text portion. Alternatively, the recognized texts may be divided into a plurality of text portions according to positions, sizes, colors, or shapes in the image. That is, different text portions include text objects located in different regions of the image; or different text portions include text objects having different shapes in the image; or different text portions include text objects having different sizes in the image; or different text portions include text objects having different colors in the image.

In one embodiment, after the one or more objects are obtained, the one or more objects may also be saved in association with the image. Before processing the image to obtain the one or more objects of the image, the method may also include: determining whether the image is associated with one or more objects; if the result of the determination is negative, obtaining one or more objects of the image; if the result of the determination is positive, obtaining the one or more objects associated with the image.

In one embodiment, if the image has been processed to obtain the one or more objects, in response to receiving a same instruction for processing the image again, the one or more objects may be directly retrieved without processing the image again. Thus, the one or more objects can be obtained rapidly.

In one embodiment, generating the interactive interface may include: obtaining an input operation onto the input area. The input area may be any one of the boxes that the user can enter information. For example, the input area may be an editable document interface or an input frame. The input operation may be a single click or a persistent press.

The generated interactive interface also includes: an operation control. The operation control is used to trigger to execute the paste instruction.

After the user selects the target object, the user may perform an operation on the operation control to generate the paste instruction and to enter the target object selected by the user into the input area.

In addition, if the user does not select the target object, after a displaying time of the interactive interface exceeds a certain threshold, the paste instruction is automatically generated and all objects in the interactive interface are pasted into the input area as the target objects.

In other words, after the interactive interface is generated, the information processing method may also include: in response to the paste instruction, entering one or more objects in the interactive interface into the input area, that is, in response to the paste instruction, entering all selectable objects in the interactive interface into the input area, or in response to the paste instruction, entering the target object selected by the user from the one or more objects into the input area.

Figure 2:
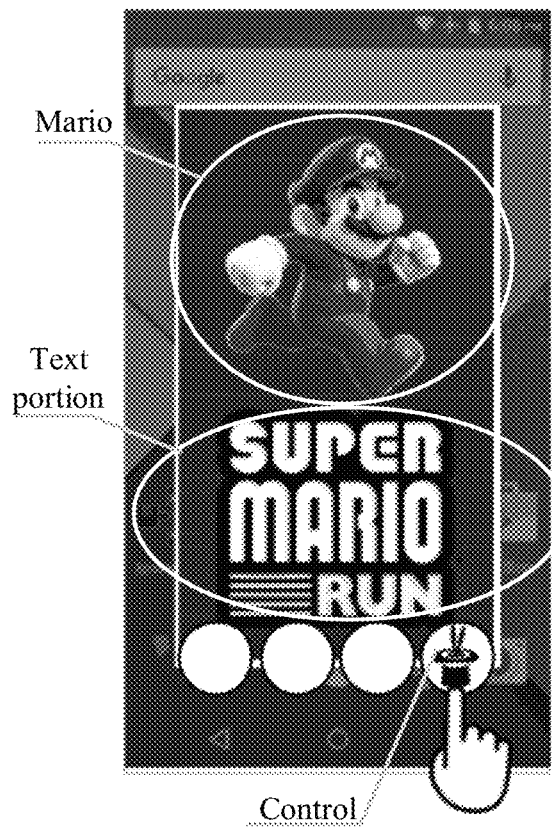
FIG. 2 illustrates a schematic diagram of an example of an image A according to some embodiments of the present disclosure.
Figure 3:
FIG. 3 illustrates a schematic diagram of three objects resulted from processing the image A according to some embodiments of the present disclosure.

FIG. 2 illustrates a schematic diagram of an example of an image A according to some embodiments of the present disclosure. For convenience of description, the image is referred to as the image A. As shown in FIG. 2, the image A includes a game character Mario, and the text "Super Mario Run". The user may trigger to generate the instruction to process the image A by using a control provided for the image A (e.g., the control pointed by a finger shown in FIG. 2). After the user triggers to generate the instruction for processing the image A, the image A is divided into three portions including one image a and two texts. FIG. 3 illustrates a schematic diagram of three objects resulted from processing the image A according to some embodiments of the present disclosure. The image a only includes Mario (i.e., the Mario image) but does not include the texts. The two texts are "Super Mario" and "Run", respectively. In practical applications, the interface shown in FIG. 3 may be displayed or may not be displayed. Or the interface may be displayed in response to user's triggering of a viewing instruction.

Figure 4:
FIG. 4 illustrates a schematic diagram of an interactive interface displayed after a user persistently presses an input area of a dialog interface according to some embodiments of the present disclosure.

After the image A is divided into the image a and the two texts, the user may persistently press the input area in the dialog interface to display the interactive interface. FIG. 4 illustrates a schematic diagram of an interactive interface displayed after a user persistently presses the input area of the dialog interface according to some embodiments of the present disclosure. The interactive interface includes the divided image a (labelled as "Image" in FIG. 4) and the two texts (i.e., "Super Mario" and "Run") and further includes the image A (labelled as "Screenshot" in FIG. 4) and a "paste" control.

Figure 5:
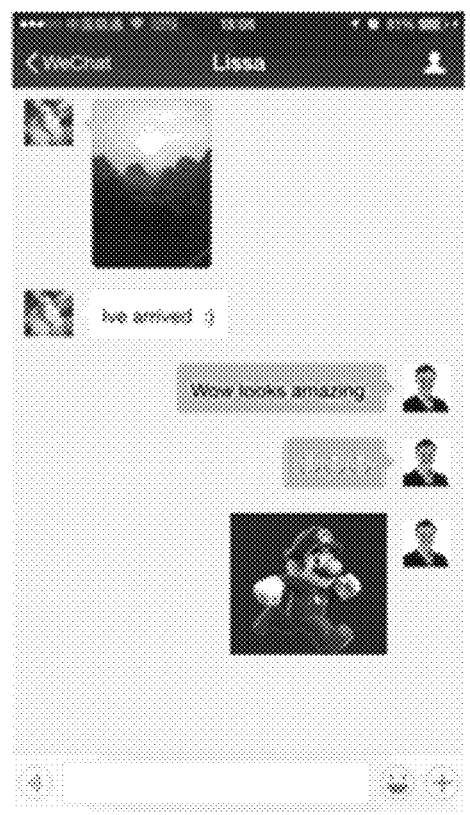
FIG. 5 illustrates a schematic diagram of the dialog interface after sending the image a according to some embodiments of the present disclosure.

Assuming the user selects the second item "Image" and clicks "Paste" control. The image a appears in the input area. After the user triggers a send instruction, the image a is displayed in the dialog interface. FIG. 5 illustrates a schematic diagram of the dialog interface after sending the image a according to some embodiments of the present disclosure.

Figure 6:
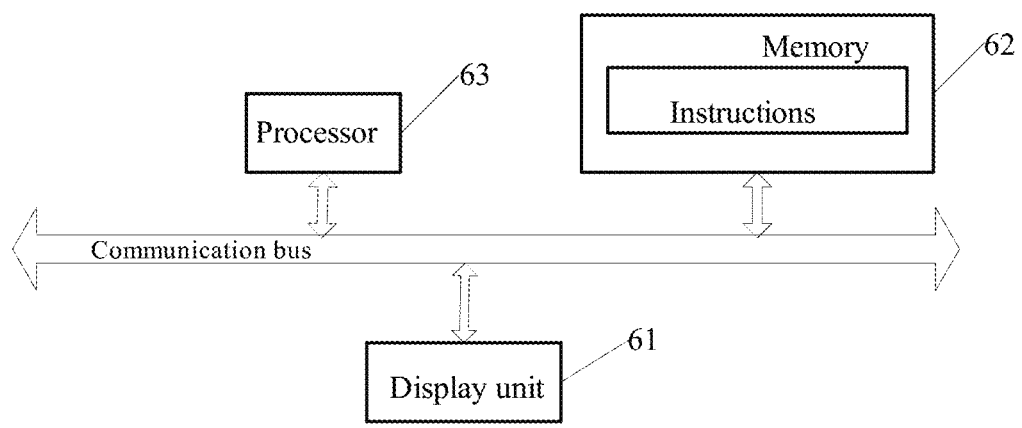
FIG. 6 illustrates a schematic diagram of an example of an electronic device according to some embodiments of the present disclosure.

The present disclosure also provides an electronic device. FIG. 6 illustrates a schematic diagram of an example of an electronic device according to some embodiments of the present disclosure. As shown in FIG. 6, the electronic device includes: a display unit 61 configured for displaying information, a memory 62 configured for at least storing a plurality of instructions, and a processor 63 configured for executing the plurality of instructions stored in the memory 62. By executing the plurality of instructions, the processor 63 performs the following process. An instruction for processing an image is obtained by the processor 63. The image contains one or more objects. In response to the instruction for processing the image, the processor 63 process the image to obtain one or more objects of the image. A type of a first object in the one or more objects are consistent with the type of the image. The processor 63 generates an interactive interface. The interactive interface includes the one or more objects. A user may select a target object through the interactive interface.

In one embodiment, in response to user's generating the instruction for processing the image, the electronic device processes the image to obtain the one or more objects of the image. That is, the one or more objects are extracted from the image. The user selects the target object from the one or more objects for a subsequent operation. Thus, manual extraction of the one or more objects from the image by the user is avoided and the user operation is simplified.

In one embodiment, the one or more objects includes two objects of different types.

In one embodiment, the interactive interface may further include the image.

In one embodiment, processing the image by the processor 63 to obtain the one or more objects of the image may include: performing an outline detection to obtain at least one outline; and based on the at least one outline, obtaining at least one first object.

In one embodiment, processing the image by the processor 63 to obtain the one or more objects of the image may include: dividing the image into a foreground and a background to obtain a foreground image and a background image.

In one embodiment, processing the image by the processor 63 to obtain the one or more objects of the image may further include: performing a text recognition process to obtain at least one text portion, where different text portions include different text objects.

In one embodiment, the processor 63 is further configured to save the one or more objects of the image in association with the image.

In one embodiment, generating the interactive interface by the processor 63 may further include: obtaining an input operation for an input area to generate the interactive interface. The interactive interface also includes an operation control configured for triggering to execute a paste instruction.

In one embodiment, the processor 63 is further configured to: in response to the paste instruction, input the one or more objects into the input area; or in response to the paste instruction, input the target object selected from the one or more objects by the user into the input area.

Through the method and the electronic device provided by the embodiments of the present disclosure, the image can be divided into one or more objects or exploded views, that is, an image extraction operation is performed on the image by the user in response to the instruction for processing the image corresponding to the image extraction operation to extract the objects in the image. For example, the image shows Mario having a mushroom on his head. After the image is processed, Mario, the mushroom, a box, and a background are extracted from the image. The extracted objects are displayed for the user to select.

In one embodiment, if the electronic device has responded to the image extraction operation, the electronic device may display the one or more objects extracted from the image for the user to select in response to the paste operation. The displayed object in response to the paste instruction may include the one or more objects extracted from the image and the control of the paste operation, such that the user may rapidly generate the paste instruction after the user select the desired object. The displayed object may further include any object that has been previously copied or cut. If the electronic device has never responded to any image extraction operation, the displayed object may only include the object that has been previously copied or cut and the control of the paste operation.

Figure 7:
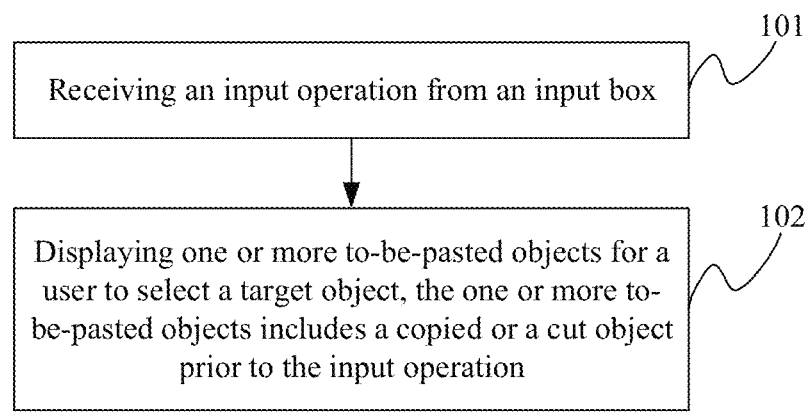
FIG. 7 illustrates a flowchart of an example of an information processing method according to some embodiments of the present disclosure.

FIG. 7 illustrates a flowchart of an example of an information processing method according to some embodiments of the present disclosure. The method may be applied to a device that can perform data processing and interact with a user, such as a mobile phone, a pad, or a computer, etc.

As shown in FIG. 7, the method may include the following steps.

Step 101: acquiring an input operation onto an input area.

Figure 8:
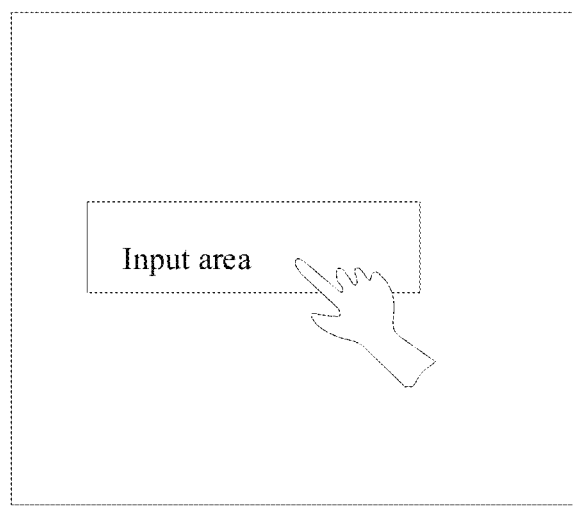
FIGS. 8-24, 25A, and 25B illustrate schematic diagrams of user's operations in various steps of an information processing method according to some embodiments of the present disclosure.

In one embodiment, as shown in FIG. 8, a device executing the method includes the input area for the user to perform various input operations. The input operation may be an operation the user performs to achieve a function, such as a persistent press operation, a double-click operation, or a mouse right-button click operation, etc. For example, the input operation may be an operation of pasting an object by the user.

For example, the input area may be a system operation interface or an application interaction interface for the input operations, such as a system search box, a system setting region, a note taking area, or an input area in a chatting application. The user may perform the operation in the input area to paste the object.

Step 102: displaying one or more to-be-pasted objects.

Figure 9:
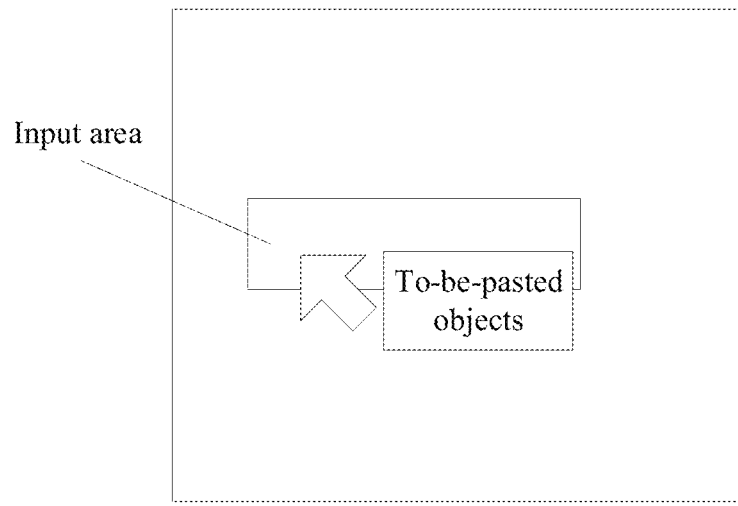
Figure 10:
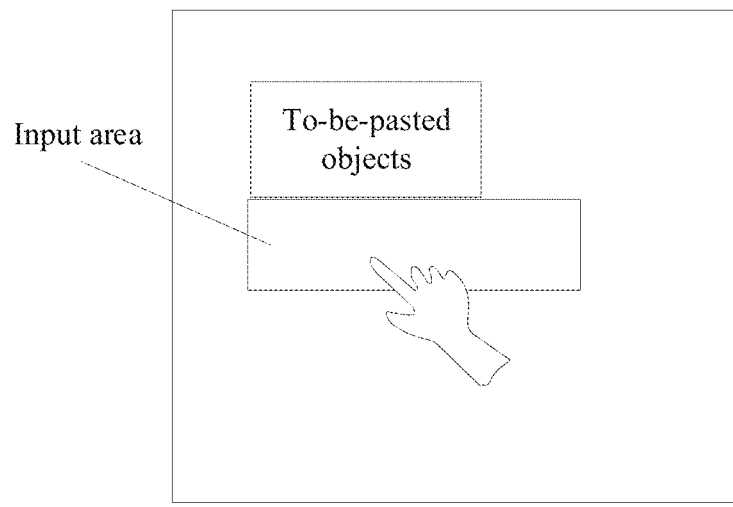
Figure 11:
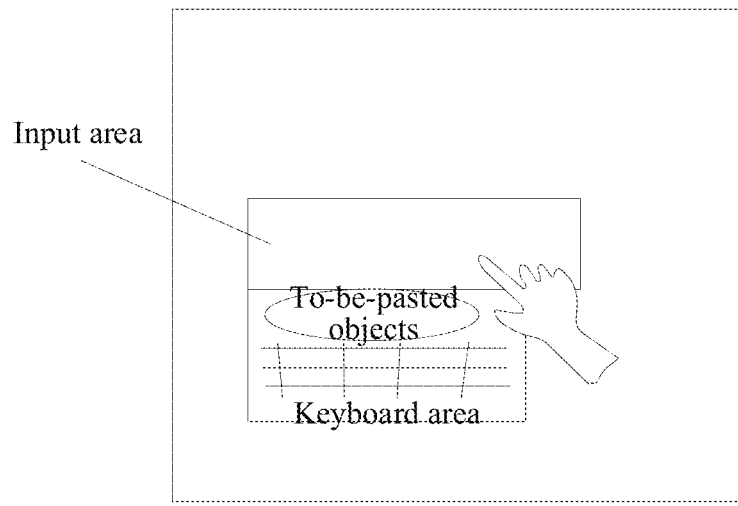

In one embodiment, one or more objects to be pasted into the input area may be displayed in a pre-set area. For example, the one or more objects to be pasted into the input area is displayed in an area directly under or to the right side of the mouse pointer in the input area as shown in FIG. 9. In another embodiment, the one or more objects to be pasted into the input area is displayed in an area directly above the input area as shown in FIG. 10. In another embodiment, the one or more objects to be pasted into the input area is displayed in a keyboard area corresponding to the input area as shown in FIG. 11.

Figure 12:
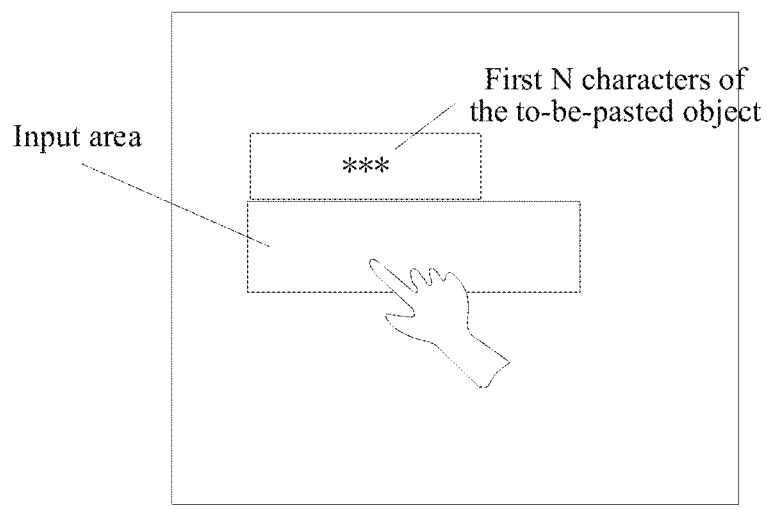
Figure 13:
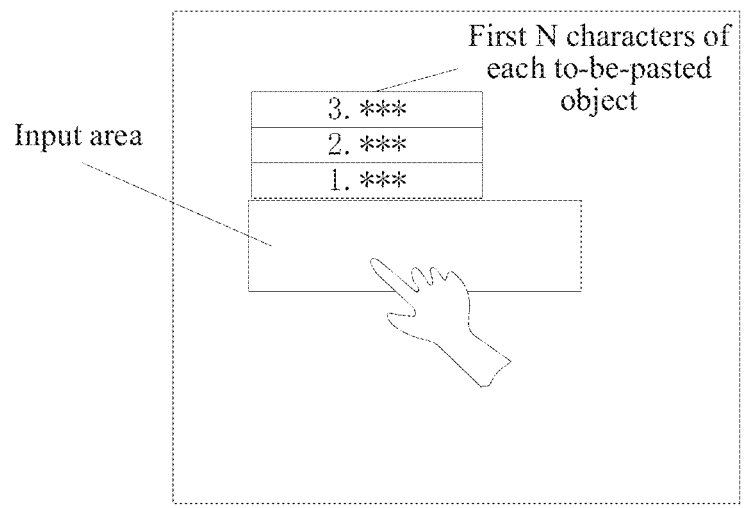
Figure 14:
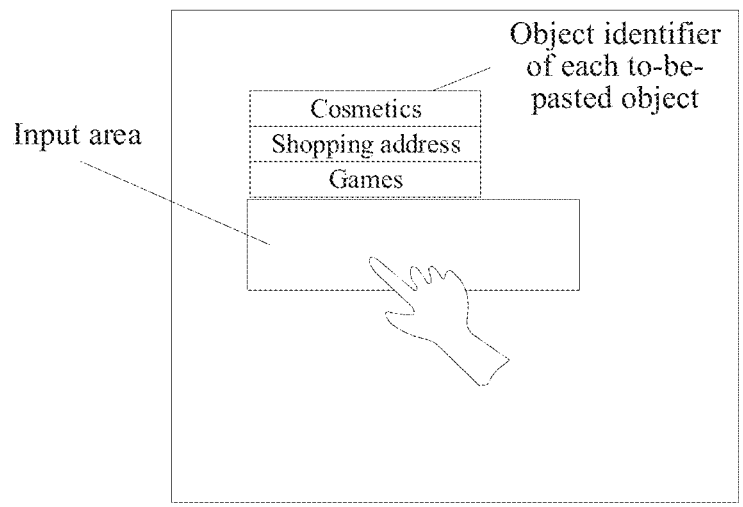

In the embodiments of the present disclosure, only one to-be-pasted object is displayed. More than one to-be-pasted object may be displayed. In response to one to-be-pasted object, the entire to-be-pasted object a portion of the to-be-pasted object may be displayed. If the to-be-pasted object includes a plurality of characters, the entire to-be-pasted object the first N characters of the to-be-pasted object may be displayed as shown in FIG. 12. In response to multiple to-be-pasted objects, all to-be-pasted objects or a portion of each to-be-pasted object may be displayed. Further, the multiple to-be-pasted objects may be labelled by object identifiers, such as digit identifiers, text identifiers, or alphabet identifiers. The object identifiers indicate attributes associated with the to-be-pasted objects, such as object, type, or date. The object identifiers may be displayed along with a portion of the corresponding to-be-pasted objects as shown in FIG. 13. Alternatively, the object identifiers may be displayed as summaries of the to-be-pasted objects as shown in FIG. 14.

In addition, the displayed one or more to-be-pasted objects may be a copied object obtained in response to a copy action prior to the input operation and/or a cut object obtained in response to a cut action prior to the input operation.

For example, the one or more to-be-pasted objects may include one or more copied objects copied prior to the input operation, one or more cut objects cut prior to the input operation, or one or more cut objects cut prior to the input operation in addition to one or more copied objects copied prior to the input operation.

Correspondingly, after the one or more to-be-pasted objects are displayed, the user may select a target object from the one or more to-be-pasted objects, or may select nothing.

In the embodiments of the present disclosure, in response to the input operation after the input operation is received, the one or more to-be-pasted objects determined in response to the copy action and/or the cut action prior to the input operation is displayed, thereby facilitating the selection of the target object to be pasted. In response to the input operation, in addition to displaying the most recently copied or cut object, the objects determined in response to the copy action and/or the cut action prior to the input operation may be displayed as well to enable the user to make selection and to avoid repeated copy actions and paste actions after the initial paste action. Thus, the process of pasting multiple objects into the input area may be streamlined, the operation complexity may be reduced, and the operation efficiency may be improved.

Figure 15A:
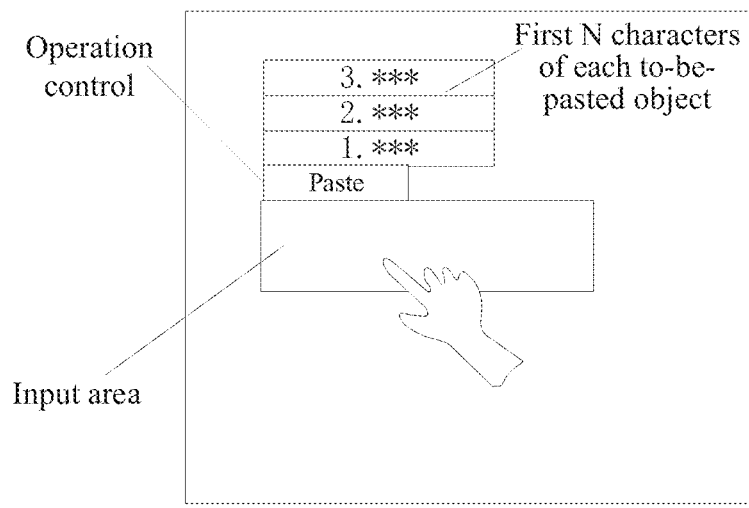

In one embodiment, in addition to displaying the one or more to-be-pasted objects, an operation control may be displayed at the same time. The operation control may be used to execute a paste instruction as shown in FIG. 15A.

For example, the to-be-pasted object and the operation control are displayed at the same time. As such, the operation control allows the user to execute the paste instruction by triggering the operation control to achieve the paste action. Correspondingly, the user may click the operation control to trigger executing the paste instruction to achieve pasting the target object after the user selects the target object from the to-be-pasted object, or selects nothing.

Correspondingly, after the paste instruction is executed, the paste instruction is responded. Entering the corresponding object in the input area includes entering the displayed one ore more to-be-pasted objects into the input area or entering the target object selected by the user from the displayed at one or more to-be-pasted objects into the input area.

In one embodiment, after the one or more to-be-pasted objects are displayed, the user may select nothing from the displayed one or more to-be-pasted objects and may directly click the operation control to execute the paste instruction to enter all displayed to-be-pasted objects into the input area. In another embodiment, the user may select nothing from the displayed one or more to-be-pasted objects and may not click the operation control. After the one or more to-be-pasted objects are displayed for a first pre-set time such as 3 seconds, the paste instruction is executed to enter all the displayed to-be-pasted objects into the input area.

Figure 15B:
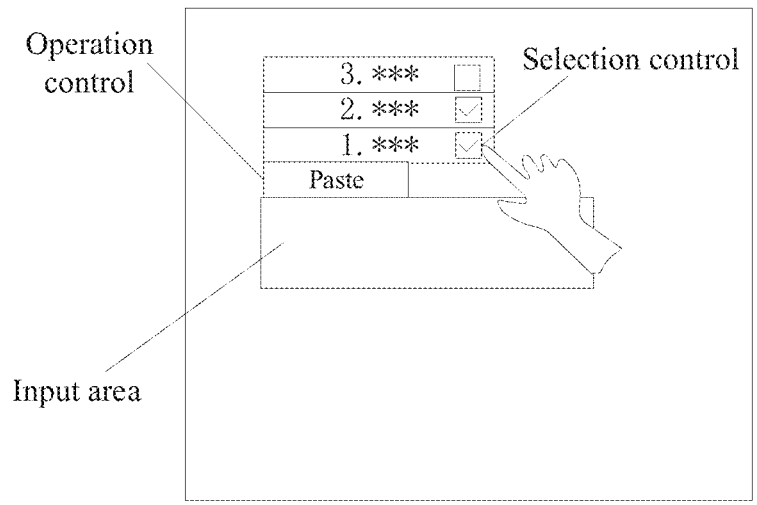

In one embodiment, after the one or more to-be-pasted objects are displayed, the user may perform a select operation on the displayed one or more to-be-pasted object. For example, a selection control displayed on one side of the to-be-pasted object may be clicked to achieve the selection operation on the to-be-pasted object, such that one or more to-be-pasted objects may be selected as the target object. Then, the operation control is clicked, as shown in FIG. 15B, to execute the paste instruction to enter the target object selected by the user into the input area. In another embodiment, after the user performs the selection operation on the displayed to-be-pasted objects to select one or more to-be-pasted objects as the target object, no click operation may be performed to the operation control. Instead, after waiting for the user to select the target object for a second pre-set time, such as 5 seconds, the paste instruction is executed to enter the target object selected by the user into the input area.

In one embodiment, displaying one or more to-be-pasted objects in step 102 may include: displaying the one or more to-be-pasted objects in a list format.

Figure 16:
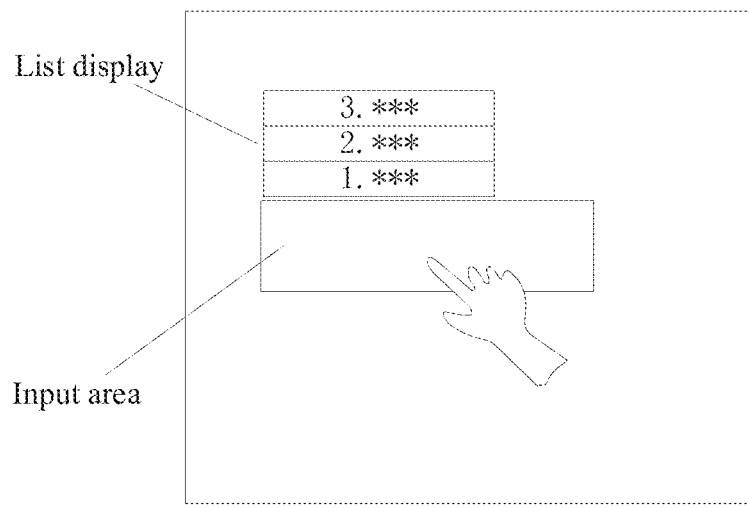

As shown in FIG. 16, the one or more to-be-pasted objects copied and/or cut prior to the input operation is displayed in the list format, including the object identifiers along with a portion of the to-be-pasted objects, to facilitate the user to make selection.

Figure 17:
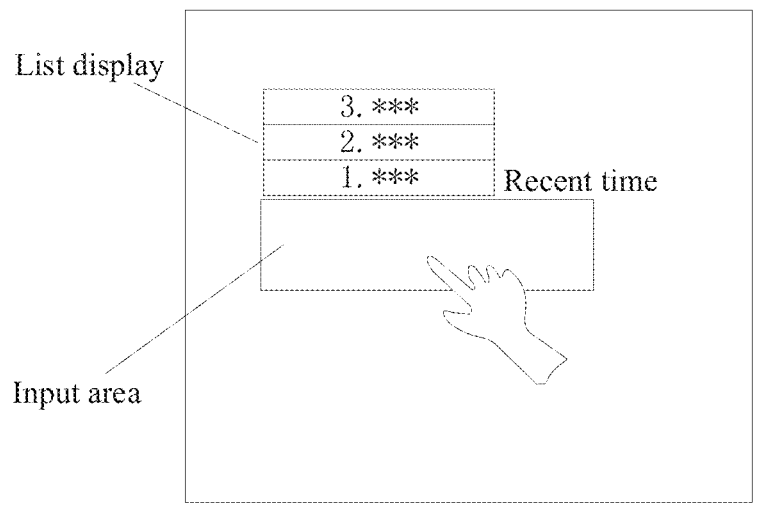
Figure 18:
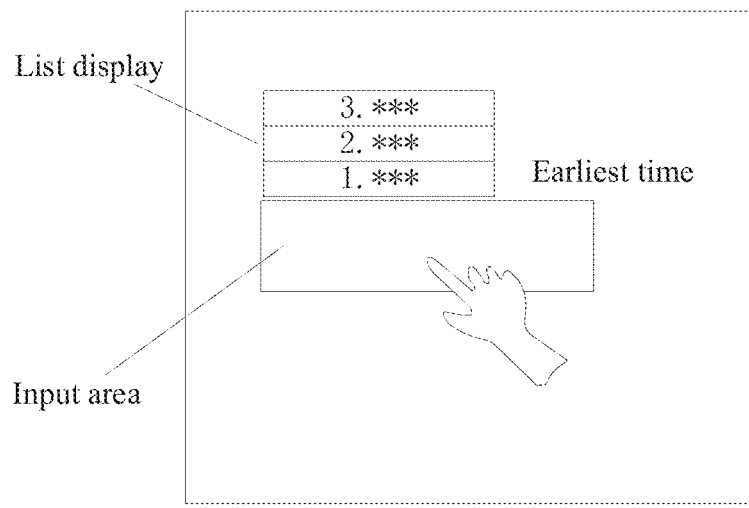

The display sequence of the to-be-pasted objects in the list may be arranged according to a pre-set display rule. In one embodiment, after a selection time of the to-be-pasted objects are obtained, the to-be-pasted objects may be sorted in the order of the selection time, such as in the chronological order or in the reverse chronological order. Then, the sorted to-be-pasted objects are displayed in the list format. For example, the operation position of the input operation in the input area is set as the origin. The to-be-pasted object with the most recent selection time is sorted to the top of the list and is displayed closest to the operation position as shown in FIG. 17. Alternatively, the to-be-pasted object with the earlies selection time is sorted to the top of the list and is displayed closest to the operation position as shown in FIG. 18.

Figure 19:
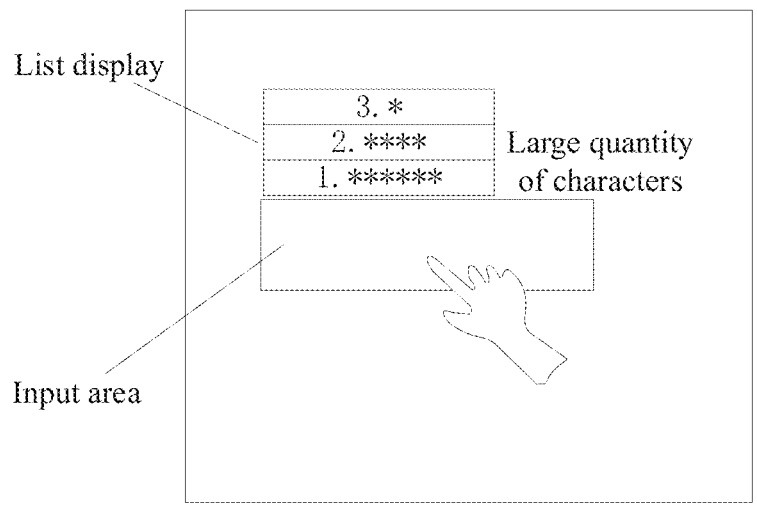
Figure 20:
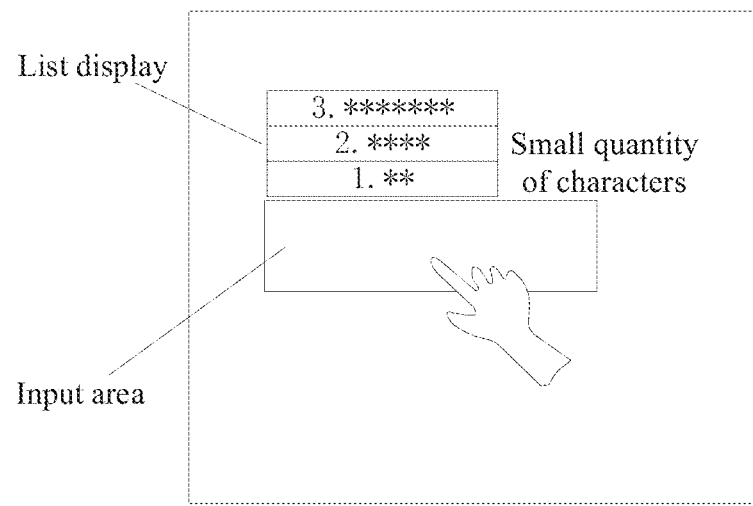

In one embodiment, after the selection times of the to-be-pasted objects are obtained, the to-be-pasted objects may be sorted in the order of the object size, such as in the order of the quantity of characters contained in the to-be-pasted object. Then, the sorted to-be-pasted objects are displayed in the list format. For example, the operation position of the input operation in the input area is set as the origin. The to-be-pasted object with the largest quantity of characters is sorted to the top of the list and is displayed closest to the operation position as shown in FIG. 19. Alternatively, the to-be-pasted object with the smallest quantity of characters is sorted to the top of the list and is displayed closest to the operation position as shown in FIG. 20.

In one embodiment, after each copy action and/or each cut action, the copied object and/or the cut object may be recorded in a clipboard, such that after the input operation is received, the to-be-pasted objects may be obtained from the clipboard for displaying. In one embodiment, the copied object and/or the cut object may be recorded on the clipboard for a certain time period or a certain quantity according to actual requirements. After the input operation is received, a desired quantity of the to-be-pasted objects may be determined for displaying. Further, the objects recorded on the clipboard may be intelligently purged according to the actual scenarios or requirements. For example, a first-in-first-out rule may be applied to delete the objects after an upper limit of the objects recorded on the clipboard is reached. In another example, the clipboard may be emptied daily in the early morning. In another example, after an application that requires a processor resource utilization rate exceeding a pre-set value is detected to start, the clipboard is emptied. For example, the clipboard is emptied in response to the launching of a large-scale game. In another example, at a pre-set interval, the objects occupying a space larger than a certain value are deleted from the clipboard and the remaining objects continue to stay on the clipboard.

In one embodiment, the quantity of the one or more to-be-pasted objects to be displayed may be configured according to the various requirements or may be configured in advance. For example, the quantity of the to-be-pasted objects to display may be determined based on the current usable space for displaying. In another example, the quantity may be configured to be 10 or 5.

Figure 21:
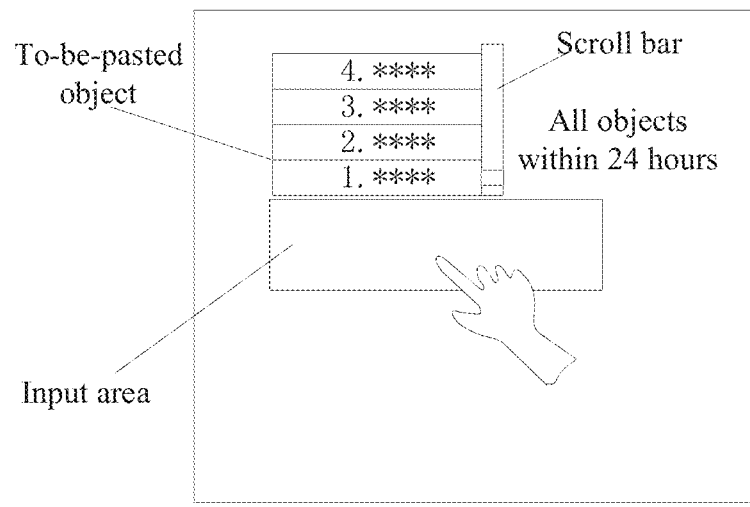
Figure 22:
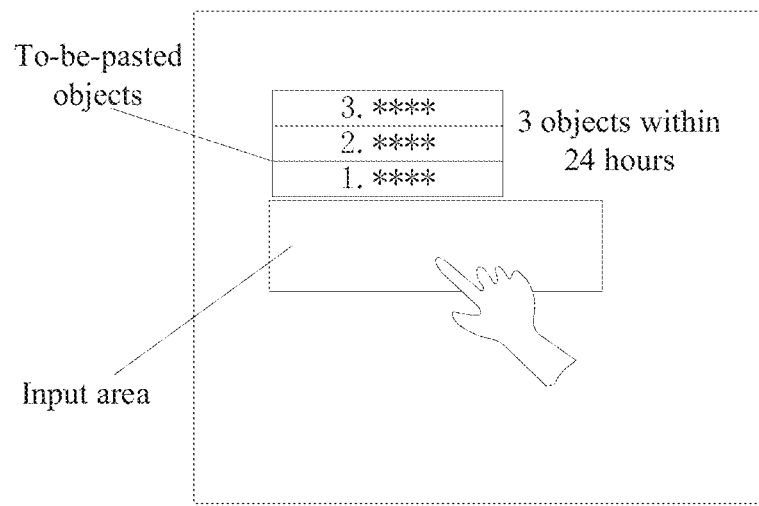

In one embodiment, the one or more to-be-pasted objects to be displayed may include all the to-be-pasted objects that are copied and/or cut within a certain time (e.g., 1 day or 4 hours) prior to the input operation. For example, the objects copied and/or cut within 24 hours prior to the input operation may be recorded as the to-be-pasted objects, which are displayed after the input operation is received, as shown in FIG. 21. If the to-be-pasted objects are too many to be displayed, a scroll bar may be used to view more to-be-pasted objects. In one embodiment, the one or more to-be-pasted objects to be displayed may include a certain quantity of the to-be-pasted objects that are copied and/or cut within a certain time prior to the input operation. For example, a quantity threshold of the to-be-pasted objects to be displayed may be configured in advance, such as 10 or 5. After the input operation is received, the objects copied and/or cut within 24 hours prior to the input operation below the quantity threshold such as 3 may be recorded as the to-be-pasted objects, which are displayed after the input operation is received, as shown in FIG. 22.

Figure 23:
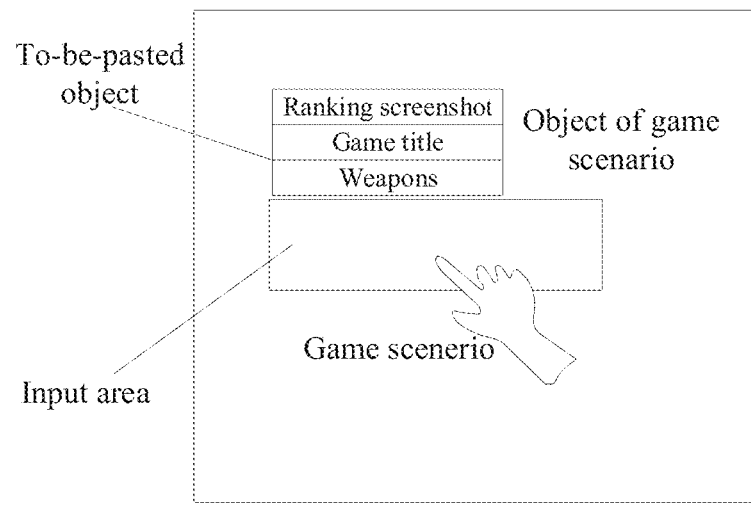
Figure 24:
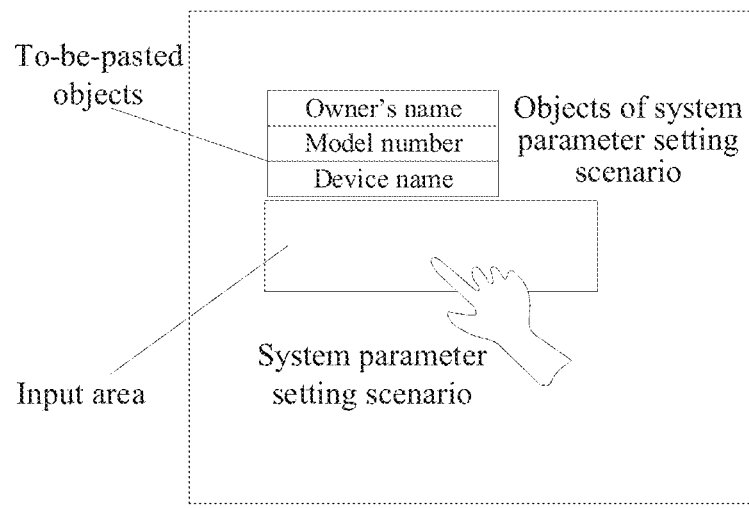

In one embodiment, at least one alternative to-be-pasted object to be displayed may include an object associated with the input scenario corresponding to the input area. That is, the to-be-pasted object associated with the input scenario corresponding to the current input area may be filtered out from all the to-be-pasted objects that are copied and/or cut prior to the input operation and the filtered to-be-pasted object is displayed. For example, the input scenario corresponding to the input area is a game scenario. After the input operation is received, the to-be-pasted objects associated with the game scenario are filtered out from all the to-be-pasted objects copied and/or cut prior to the input operation, including weapons, the game title, the game ranking screenshot, etc. The filtered objects are displayed as shown in FIG. 23. In another example, the input scenario corresponding to the input area is a system parameter setting scenario. After the input operation is received, the to-be-pasted objects associated with the system parameter setting scenario are filtered out from all the to-be-pasted objects copied and/or cut prior to the input operation, including the device name, the model number, the owner's name, etc. The filtered objects are displayed as shown in FIG. 24.

Figure 25A:
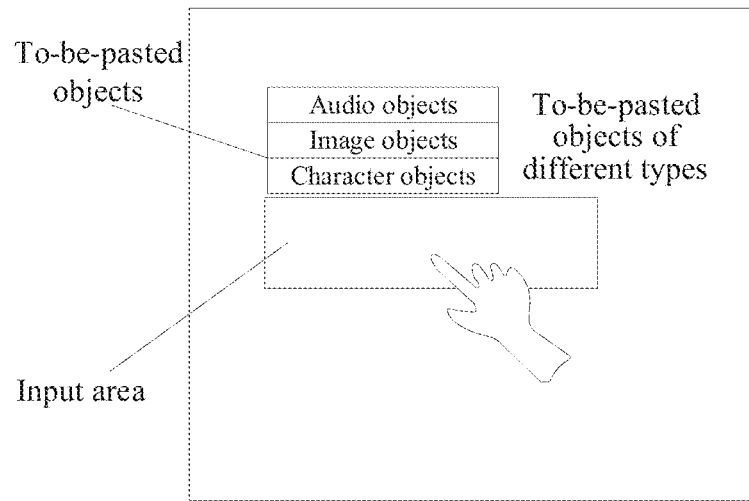

In one embodiment, the one or more to-be-pasted objects may include one or more types of the to-be-pasted objects. That is, after the input operation is received, the to-be-pasted objects displayed for the user to make selection may include different types of the objects, such as image objects, audio objects, or character objects, etc. Different types of the to-be-pasted objects may be displayed to the user in a certain manner, as shown in FIG. 25A.

For example, different types of the to-be-pasted objects are first sorted to group the to-be-pasted objects of a same type together for displaying. In another example, the sorted to-be-pasted objects are displayed orderly in the list format as previously described.

Figure 25B:
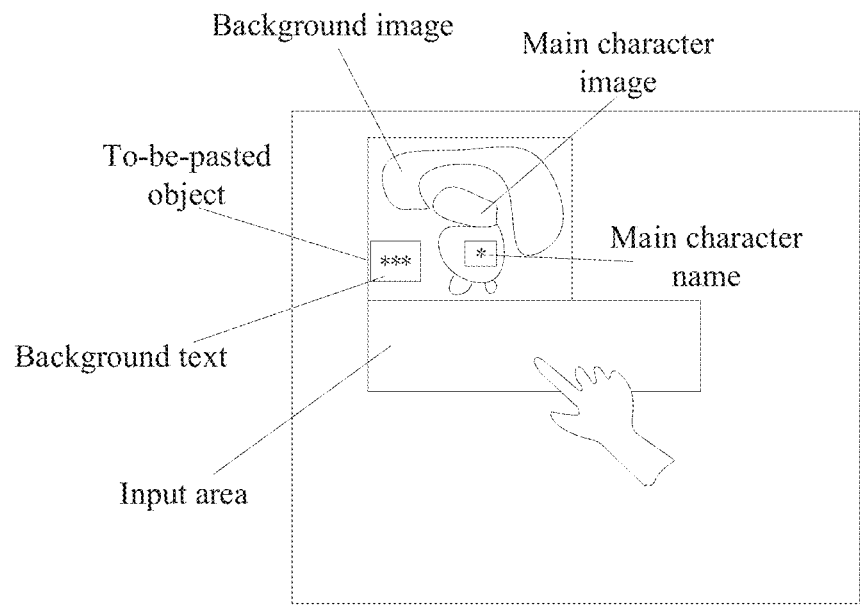

In one embodiment, before the input operation is received and after an image is divided, a deep learning model may be used to analyze and recognize the divided image to obtain one or more objects in the image, such as a background image, a background text object, a main character image, character names, etc. The one or more objects are recorded on the clipboard. After the input operation is received, the one or more objects recorded on the clipboard is retrieved and displayed. As shown in FIG. 25B, the main character name, the main character image, the background text object, and the background image are displayed in an image group. The image group may be determined based on the corresponding positions of the to-be-pasted objects on the original image.

Figure 26:
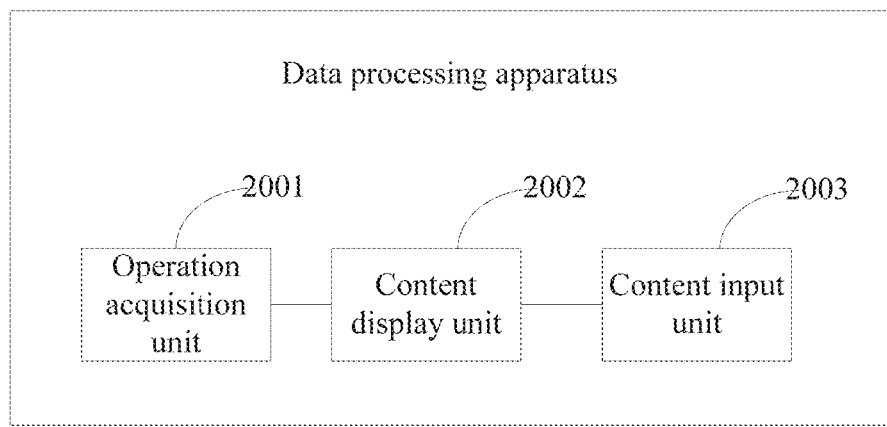
FIG. 26 illustrates a schematic diagram of an example of a data processing apparatus according to some embodiments of the present disclosure.

FIG. 26 illustrates a schematic diagram of an example of a data processing apparatus according to some embodiments of the present disclosure. As shown in FIG. 26, the apparatus may include: an operation acquisition unit 2001 configured to acquire an input operation onto an input area, an object display unit 2002 configured to display one or more to-be-pasted objects for a user to select a target object, and an object input unit 2003 configured to enter the one or more to-be-pasted objects into the input area in response to a paste instruction or to enter the target object selected by the user from the one or more to-be-pasted objects into the input area in response to the paste instruction.

The operation acquisition unit 2001 may be an input device to acquire the input operation.

As shown in FIG. 8, the device executing the method includes the input area for the user to perform various input operations. The input operation may be the operation the user performs to achieve the function, such as the persistent press operation, the double-click operation, or the mouse right-button click operation, etc. For example, the input operation may be the operation of pasting the object by the user.

For example, the input area may be the system operation interface or the application interaction interface for the input operations, such as the system search box, the system setting region, the note taking area, or the input area in the chatting application. The user may perform the operation in the input area to paste the object.

The one or more to-be-pasted objects may be the copied object obtained in response to the copy action prior to the input operation onto the input area and/or the cut object obtained in response to the cut action prior to the input operation onto the input area.

When displaying the one or more to-be-pasted object, the object display unit 2002 may display the one or more to-be-pasted object in the list format. The order of the to-be-pasted objects displayed in the list corresponds to the order of the selection time of the to-be-pasted objects. The one or more to-be-pasted objects may be the objects associated with the input scenario corresponding to the input area. The to-be-pasted objects may include the to-be-pasted objects of different types.

In addition, the object display unit 2002 is further configured to display the operation control. The operation control is configured to trigger executing the paste instruction.

In the data processing apparatus provided by the embodiments of the present disclosure, in response to the input operation after the input operation is received, the one or more to-be-pasted objects determined in response to the copy action and/or the cut action prior to the input operation is displayed, thereby facilitating the user to select the target object to paste. In response to the input operation, in addition to displaying the most recently copied or cut object, the objects determined in response to the copy action and/or the cut action prior to the input operation may be displayed as well to facilitate the user to make selection and to avoid repeated copy actions and paste actions after the initial paste action. Thus, the process of pasting multiple objects into the input area may be streamlined, the operation complexity may be reduced, and the operation efficiency may be improved.

The specific implementation and examples of the structures in the embodiments of the present disclosure may refer to the foregoing method embodiments and will not be described in detail herein.

Figure 27:
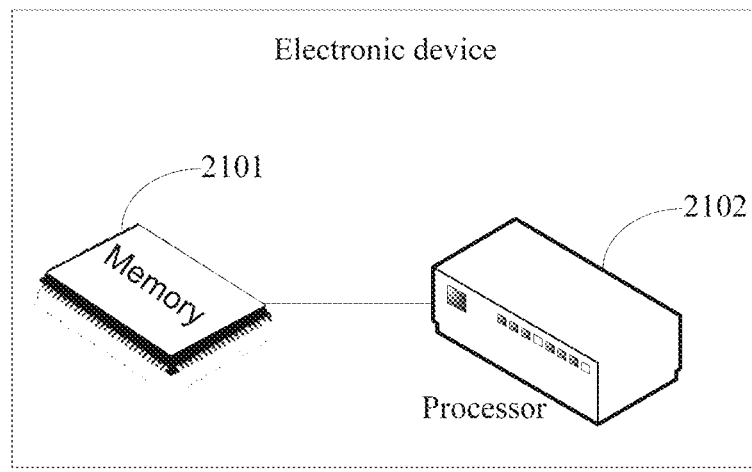
FIG. 27 illustrates a schematic diagram of an example of an electronic device according to some embodiments of the present disclosure.

FIG. 27 illustrates a schematic diagram of an example of an electronic device according to some embodiments of the present disclosure. As shown in FIG. 27, the electronic device may include a memory 2101 configured to store an application program and data generated during the execution of the application program and a processor 2102 configured to execute the application program stored in the memory 2101.

The memory 2101 may be a computer readable medium, including a non-persistent memory, such as a random-access memory (RAM), and/or a non-volatile memory, such as a read-only memory (ROM) or flash memory. These memories are the examples of the computer readable medium.

The processor 2102 executes the application program to implement: receiving the input operation from the input area and displaying one or more to-be-pasted objects for the user to select the target object. The one or more to-be-pasted objects may be the copied object obtained in response to the copy action prior to the input operation and/or the cut object obtained in response to the cut action prior to the input operation.

The processor 2102 may include one or more cores. The one or more cores retrieve the corresponding program unit from the memory 2101. Parameters of the one or more cores are adjusted to implement the aforementioned function.

When displaying the one or more to-be-pasted objects, the object display unit 2002 may display the to-be-pasted objects in the list format. The order of the to-be-pasted objects displayed in the list corresponds to the order of the selection time of the to-be-pasted objects. The to-be-pasted object may be the object associated with the input scenario corresponding to the input area. The to-be-pasted objects may include the to-be-pasted objects of different types.

In addition, the processor 2102 is further configured to display the operation control. The operation control is configured to trigger executing the paste instruction.

Correspondingly, the processor 2102 is further configured to respond to the paste instruction by entering the to-bepasted objects into the input area or entering the target object selected by the user from the to-be-pasted objects into the input area.

In the electronic device provided by the embodiments of the present disclosure, in response to the input operation after the input operation is received, the one or more to-be-pasted objects determined in response to the copy action and/or the cut action prior to the input operation is displayed, thereby facilitating the user to select the target object to paste. In response to the input operation, in addition to displaying the most recently copied or cut object, the objects determined in response to the copy action and/or the cut action prior to the input operation may be displayed as well to facilitate the user to make selection and to avoid repeated copy actions and paste actions after the initial paste action. Thus, the process of pasting multiple objects into the input area may be streamlined, the operation complexity may be reduced, and the operation efficiency may be improved.

The specific implementation and examples of the structures in the embodiments of the present disclosure may refer to the foregoing method embodiments and will not be described in detail herein.

Figure 28:
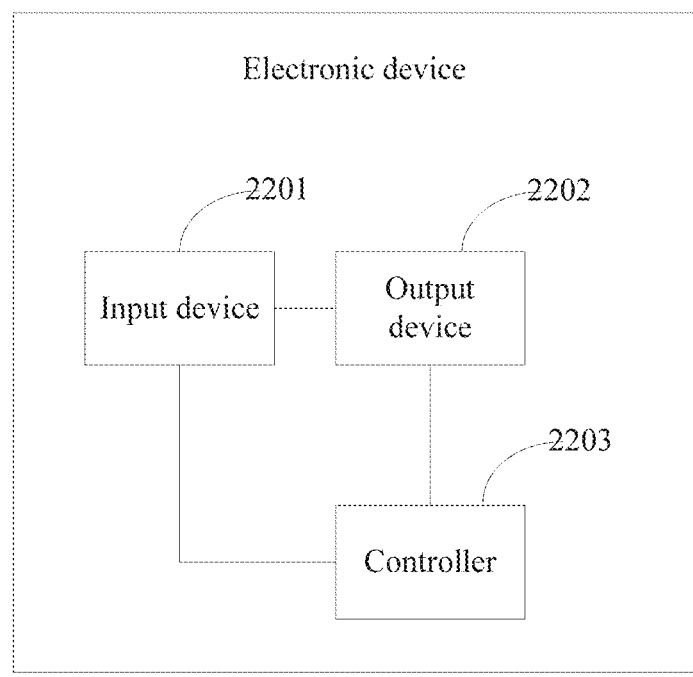
FIG. 28 illustrates a schematic diagram of another example of an electronic device according to some embodiments of the present disclosure.

FIG. 28 illustrates a schematic diagram of another example of an electronic device according to some embodiments of the present disclosure. As shown in FIG. 28, the electronic device may include an input device 2201 configured to acquire the input operation onto the input area, an output device 2202 to display one or more to-be-pasted objects for the user to select the target object to paste, and a controller 2203 configured to respond to the paste instruction by entering the one or more to-be-pasted objects into the input area or entering the target object selected by the user from the one or more to-be-pasted objects into the input area.

The one or more to-be-pasted objects may be the copied object obtained in response to the copy action prior to the input operation and/or the cut object obtained in response to the cut action prior to the input operation.

When displaying the one or more to-be-pasted objects, the object display unit 2002 may display the one or more to-be-pasted objects in the list format. The order of the to-be-pasted objects displayed in the list corresponds to the order of the selection times of the to-be-pasted objects. One or more to-be-pasted objects may be the object associated with the input scenario corresponding to the input area. The to-be-pasted objects may include the to-be-pasted objects of different types.

In addition, the output device 2202 is further configured to display the operation control. The operation control is configured to trigger executing the paste instruction.

Further, the input device 2202 may be controlled by the controller 2203 to display the to-be-pasted objects.

In the electronic device provided by the embodiments of the present disclosure, in response to the input operation after the input operation is received, the one or more to-be-pasted object determined in response to the copy action and/or the cut action prior to the input operation is displayed, thereby facilitating the user to select the target object to paste. In response to the input operation, in addition to displaying the most recently copied or cut object, the objects determined in response to the copy action and/or the cut action prior to the input operation may be displayed as well to facilitate the user to make selection and to avoid repeated copy actions and paste actions after the initial paste action. Thus, the process of pasting multiple objects into the input area may be streamlined, the operation complexity may be reduced, and the operation efficiency may be improved.

In response to the paste operation triggered in the input area, the method or the electronic device provided by the embodiments of the present disclosure can display in one time one or more objects copied and/or cut previously for the user to make selection. The one-time displayed one or more objects includes the objects of different types, such as images or texts. Also included in the interface displaying the one or more objects in one time is the paste control. By performing an operation on the paste control, the user may paste the entire objects selected from the displayed one or more objects into the input area in one time. In one embodiment, the user may directly operate on the paste control to paste the most recently copied and/or cut object into the input area by default, thereby repeating the user's experience of the pasting operation. Thus, in response to the paste instruction, it is necessary to further determine whether the selection operation for displaying the one or more objects in one time is responded.

The specific implementation and examples of the structures in the embodiments of the present disclosure may refer to the foregoing method embodiments and will not be described in detail herein.

It should be noted that the embodiments of the present disclosure are described in a progressive manner, and each embodiment focuses on differences from other embodiments. The same or similar parts between the embodiments can be mutually referred to with each other. Because the apparatus embodiments correspond to the method embodiments, the description of the apparatus is relatively simple and may refer to the corresponding description of the method.

It should be understood by those of ordinary skill in the art that the units and the method steps in the disclosed embodiments may be implemented in electronic hardware or computer software combined with the electronic hardware. Whether a function is implemented in hardware or software depends on practical applications and design constraints of the technical solution. Those skilled in the art may implement the function specified for each specific application in different ways without departing from the scope of the present disclosure.

In the embodiments of the present disclosure, the disclosed system, device and method may be implemented by other means. Further, the illustrated or discussed mutual coupling, direct coupling or communication connection may be through certain interfaces. Indirect coupling or communication connection between devices or units may be electrical, mechanical, or in other forms.

The units described as separate components may or may not be physically separated. The components illustrated as the units may or may not be physical units, that is, may be located at one place or may be distributed onto a plurality of network units. Based on the practical requirements, some or all units may be selected to achieve the objectives of the embodiments.

In addition, the functional units in the embodiments of the present disclosure may be integrated in one processing unit, may be separate physical units, or may include two or more units integrated into one unit.

It should be understood that, in the embodiments of the present disclosure, claims, embodiments, and features may be combined with each other to solve the aforementioned technical problem.

The functions may be implemented in software function units and may be sold or used as a standalone product, which is stored in a computer readable storage medium. As such, part of the technical solution of the present disclosure or the innovative part of the technical solution may be implemented in the form of a software product. Stored in a storage medium, the computer software product may include a plurality of instructions to be executed by a computer device (e.g., a personal computer, a server, or a network device) to implement all or some of the steps of the method embodiments of the present disclosure. The storage medium includes: a USB disk, a portable hard disk, a read-only memory (ROM), a random-access memory (RAM), a magnetic disk, an optical disk, or other medium suitable for storing program code.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An information processing method, comprising:
    acquiring, by a processor, an instruction for processing a screenshot image including a plurality of sub-images containing corresponding objects;
    in response to the instruction for processing the image, dividing the image to a plurality of sub-images, by the processor, by performing an outline detection on the image to obtain at least one outline and obtaining a first object among the objects having an object type consistent with a type of the screenshot image and a second object among the objects having an object type consistent with a type of image of text;
    performing an object identification of the objects based on attributes of the objects, including performing a text recognition in response to receiving the second object to obtain at least one text portion;
    directly automatically generating, by the processor, after the objects are obtained, an interactive interface including each of the objects corresponding to the screenshot image and each of the plurality of sub-image and the interactive interface being configured for selecting a target object from the corresponding objects and pasting the target object to a desired location; and
    displaying results of the object identification along with at least a portion of the target object.

2. The method according to claim 1, wherein:
    the objects include two objects of different types.

3. The method according to claim 2, wherein:
    the interactive interface further includes the screenshot image.

4. The method according to claim 1, wherein obtaining objects includes:
    dividing the screenshot image into a foreground and a background to obtain a foreground image object and a background image object.

5. The method according to claim 1, wherein the at least one text portion includes different text portions corresponding to different text objects.

6. The method according to claim 1, further including:
    storing the objects in association with the screenshot image.

7. The method according to claim 1, wherein generating the interactive interface includes:
    receiving an input operation from an input area; and
    generating the interactive interface including an operation control for a paste instruction.

8. The method according to claim 7, further including:
    in response to the paste instruction, entering the objects into the input area; or
    in response to the paste instruction, entering the target object selected from the objects into the input area.

9. An electronic device, comprising:
    a display unit;
    a memory configured to store a plurality of instructions; and
    a processor configured to retrieve and execute the plurality of instructions stored in the memory to:
    acquire an instruction for processing a screenshot image including a plurality of sub-images containing corresponding objects;
    in response to the instruction for processing the screenshot image, divide the screenshot image to a plurality of sub-images by performing an outline detection on the screenshot image to obtain at least one outline and obtaining a first object of the objects having a type consistent with a type of the image and a second object among the objects having an object type consistent with a type of image of text;
    perform an object identification of the objects based on attributes of the objects, including performing a text recognition in response to receiving the second object to obtain at least one text portion;
    directly automatically generate, after the objects are obtained, an interactive interface on the display unit, the interactive interface including each of the objects corresponding to the screenshot image and each of the plurality of sub-image and the interactive interface being configured for selecting a target object from the objects and pasting the target object to a desired location; and
    display results of the object identification along with at least a portion of the target object.

10. The electronic device according to claim 9, wherein:
    the objects include two objects of different types.

* * * * *